(12) United States Patent
Gay

(10) Patent No.: US 6,915,588 B1
(45) Date of Patent: Jul. 12, 2005

(54) SPIRIT LEVEL

(76) Inventor: Kelvin Richard Gay, Terra Nova, Treween, Alternum, Launceston, Cornwall PL15 7RD (GB)

( * ) Notice: Subject to any disclaimer, the term of this patent is extended or adjusted under 35 U.S.C. 154(b) by 0 days.

(21) Appl. No.: 09/959,279

(22) PCT Filed: Apr. 20, 2000

(86) PCT No.: PCT/GB00/01556

§ 371 (c)(1),
(2), (4) Date: Jan. 22, 2002

(87) PCT Pub. No.: WO00/63644

PCT Pub. Date: Oct. 26, 2000

(30) Foreign Application Priority Data

Nov. 11, 1999 (GB) .............................................. 9926754

(51) Int. Cl.$^7$ ................................................ G01C 9/00
(52) U.S. Cl. .............................. 33/451; 33/485; 33/382
(58) Field of Search ........................ 33/483, 484, 485, 33/451, 809, 379, 381, 382, 374, 492, 494, 333, 334, 365

(56) References Cited

U.S. PATENT DOCUMENTS

| | | | | |
|---|---|---|---|---|
| 1,365,286 A | * | 1/1921 | Sjokvist et al. ................ | 33/374 |
| 1,845,801 A | * | 2/1932 | Kupferman ................... | 33/451 |
| 1,892,622 A | * | 12/1932 | Mayes .......................... | 33/381 |
| 2,252,311 A | * | 8/1941 | Ware ............................ | 33/492 |
| 2,365,735 A | * | 12/1944 | Ware ............................ | 33/489 |
| 2,673,399 A | * | 3/1954 | Raeder ......................... | 33/485 |
| 3,832,782 A | | 9/1974 | Johnson et al. | |
| 4,399,616 A | * | 8/1983 | Jansson ........................ | 33/494 |
| 5,165,650 A | * | 11/1992 | Letizia ......................... | 33/379 |
| 5,577,327 A | * | 11/1996 | Archambault ................. | 33/374 |
| 6,029,359 A | | 2/2000 | Szumer | |

FOREIGN PATENT DOCUMENTS

| | | |
|---|---|---|
| DE | 195 30 990 A1 | 4/1997 |
| JP | 51123173 | 10/1976 |
| JP | 08072486 | 3/1996 |

* cited by examiner

Primary Examiner—Christopher W. Fulton
Assistant Examiner—Travis Reis
(74) Attorney, Agent, or Firm—Nath & Associates; Harold L. Novick

(57) ABSTRACT

A spirit level has a body member containing a leveling tube, in which the base of the body member has a width greater than the width of the body member in any other plane parallel with the base. Preferably the body member is triangular in cross section and may include three elongate wing or flange members extending radially from a central hub region. The body member may have axially-extending, for example telescopic, end members.

7 Claims, 4 Drawing Sheets

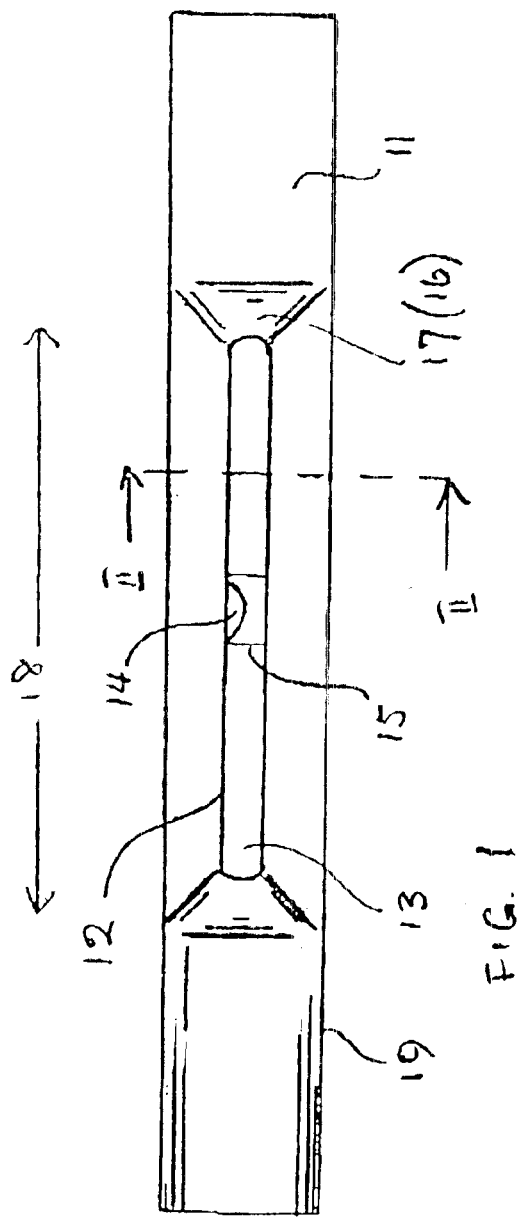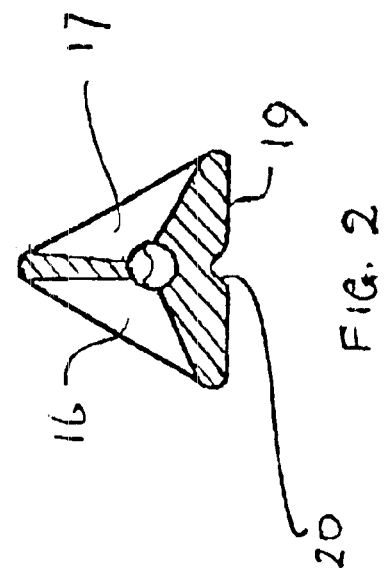
FIG. 1
FIG. 2

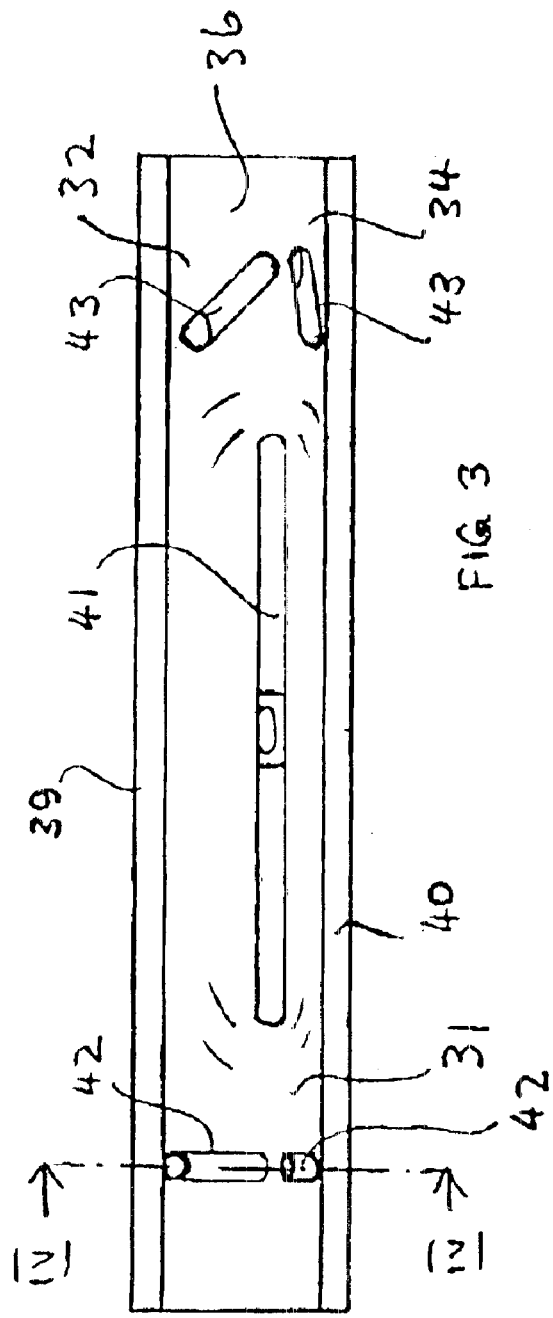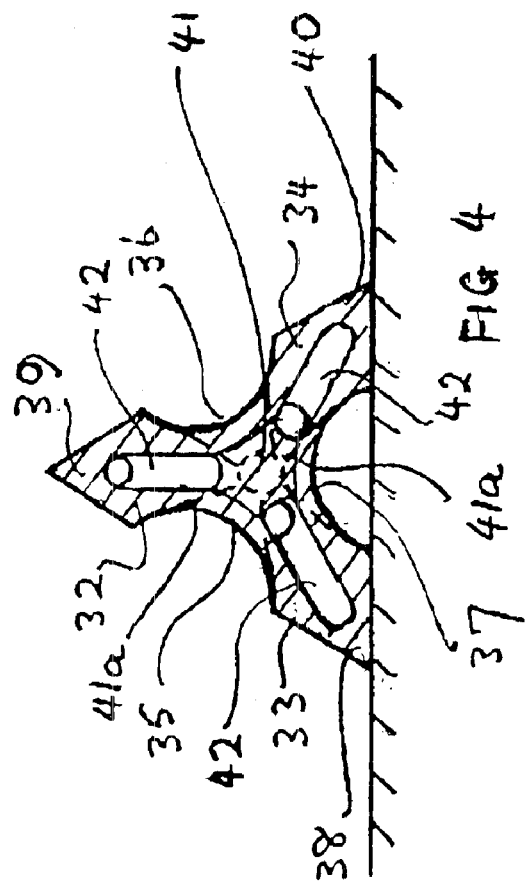

SPIRIT LEVEL

This invention relates to spirit levels.

Spirit levels are well-known tools for use by builders and other tradesmen, whether amateur or professional, in erecting, repairing, extending and fitting out buildings or other structures, and may be used out of doors or indoors. In use, they are placed on a working surface to check that it is substantially horizontal and, if necessary, to adjust the angle of the surface to render it horizontal. However, conventional spirit levels are prone to being easily knocked over or off the working surface either in windy conditions or when accidentally dislodged by another object, since the body member which contains the levelling tube has a relatively narrow base in relation to its height.

It is an object of the present invention to provide a spirit level which overcomes the above disadvantages of existing spirit levels.

According to one aspect of the present invention, a spirit level comprises a body member containing a levelling tube, in which the base of the body member has a width greater than the width of the body member in any other plane parallel with the base.

Preferably, the base width is greater than the median width of the body member; by "median width" in this specification is meant half the sum of the overall base width and the top or upper width. The invention results in greater inherent stability in that a greater degree of lateral pivoting about a base edge is necessary before the centre of gravity is vertically above that edge.

In one embodiment, the body member is substantially triangular in overall cross section, subject to the possibility of having rounded or chamfered linear edges. Preferably, the triangle is equilateral, whereby the side faces of the body member may be configured to allow the levelling tube to be viewed from any face, thus enabling any other face of the body member to be used as the base. It will be understood, however, that the sides are not necessarily required to be planar. The levelling tube may be carried within the body member in conventional manner, either parallel with at least the base or, in the case of a curved measuring tube, with the plane which contains the curvature at a right angle to the base. The body member may comprise three elongate wing or flange members extending radially from a central hub region and the levelling tube may be carried axially thereof with the wing or flange members being suitably cut away in a longitudinally-central zone to allow the tube to be visible, or a levelling tube may be carried in one or preferably in each wing or flange member, parallel with the longitudinal axis of the body member. One or more of the wing or flange members may also include levelling tubes disposed orthogonally to the longitudinal axis and/or at a predetermined acute angle, conventionally 45°, thereto, to enable vertical and 45° (or other angled) sloping surfaces or workpieces to be tested. The wing or flange members may be shaped or configured to improve strength in the hub region or to provide for better contact with pipes, tubing or other curved workpiece surfaces while conserving the general "Y" cross-sectional shape whereby, when the device is placed on a flat surface, the outer regions of two of the wing or flange members provide a stable base for the body member.

In another embodiment, the spirit level may comprise a central body member including one or more levelling tubes, the body member having axially-extendable end members to facilitate use on larger surfaces. The end members should have the same size as each other and be of generally triangular configuration, which may include a tri-lobal configuration with each lobe extending radially preferably with an angle of 120° subtended between each pair of lobes. The end members may be carried on arms with means for sliding, preferably axially, within the body member; the arms may be telescopic to accommodate further extension distances. The end members should have their triangular apices in registration when viewed longitudinally with means for prevention of mutual axial rotation, for example by forming the sliding means from non-circular slidable elements. The body member itself preferably has the same cross-sectional shape and dimensions as the end members with the triangular apices of the body member being in longitudinal registration with those of the end members. The end members may carry levelling tubes to enable vertical or sloping surfaces or workpieces to be tested.

Spirit levels according to the invention may be constructed from an axially-central core member formed with recesses or cavities for receiving keying portions of the flange members at the correct disposition. The cavities may be dovetail-shaped in cross section for secure accommodation of the flange members, which themselves may be cross-sectionally shaped or profiled in order, for example, to provide flat workpiece-engaging surfaces whereby one such surface on one flange member is co-planar with another such surface on another flange member to enable the spirit level to be placed stably on a flat surface supported by co-planar surfaces on respective flange members. Alternatively, the flange members may be formed from sheet material to a desired cross-sectional shape and having base elements which engage in the recesses, which may extend radially inwardly from the outer surface of a cylindrical core member. Preferably, the base elements of adjacent flange members are accommodated in side-by-side relationship in a common recess and may be retained therein by virtue of projections on either the base elements or recess walls and which engage in corresponding grooves formed in the other of the base elements and recess walls.

Embodiments of the invention will now be described by way of example with reference to the accompanying drawings, of which FIG. 1 is a side elevation of one embodiment of a spirit level of equilateral-triangular section;

FIG. 2 is a cross section through the spirit level of FIG. 1, on the line II—II;

FIG. 3 is a side elevation of another embodiment having radially-directed wings;

FIG. 4 is a cross section on the line IV—IV of FIG. 3;

Figure 7:
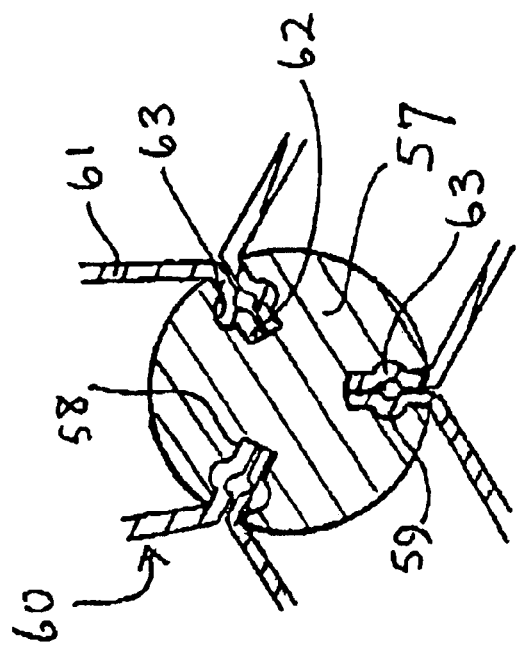
FIG. 7 is a fragmentary cross-sectional view of an alternative embodiment to that of FIG. 5.

Referring to FIG. 1, to a spirit level consists of a body member 11 and a levelling tube 12 containing a suitable liquid 13 forming a "bubble" of air 14 by surface tension forces, in known manner. The tube 12 has marks 15 formed thereon to indicate the position for the bubble when the spirit level is horizontal.

As shown more clearly in FIG. 2, the body member 11 is triangular in cross section with rounded longitudinal edges; the sides 16, 17 of the body member are cut away in a central zone 18 to enable the levelling tube to be viewed from either side. The remaining side 19 of the body member forms the base of the instrument and is provided with a longitudinal groove 20 to enable the instrument more easily to be supported on pipe work. However, either side 16 and 17 could be used as the base; the levelling tube would be visible through the other of the sides 16, 17.

Referring to FIGS. 3 and 4, the spirit level has a body member 31 in the basic cross-sectional shape of a "Y", the three wings 32–34 being mutually radially disposed at 120°.

The wings are faired in between adjacent pairs thereof to provide arcuate seating surfaces 35–37 for use against pipes, tubes or other curved surfaces, while the extremities 38—40 provide bases for seating on flat surfaces as shown in FIG. 4. A central horizontal levelling tube 41 is visible through cut-away parts of the fairing indicated by dashed lines 41a and vertical and 45° levelling tubes 42, 43 are provided at each end region, one of each in each respective wing.

In other embodiments, other cross-sectional shapes may be used; a horizontal levelling tube could also be used in each wing in further embodiments.

Figure 5:
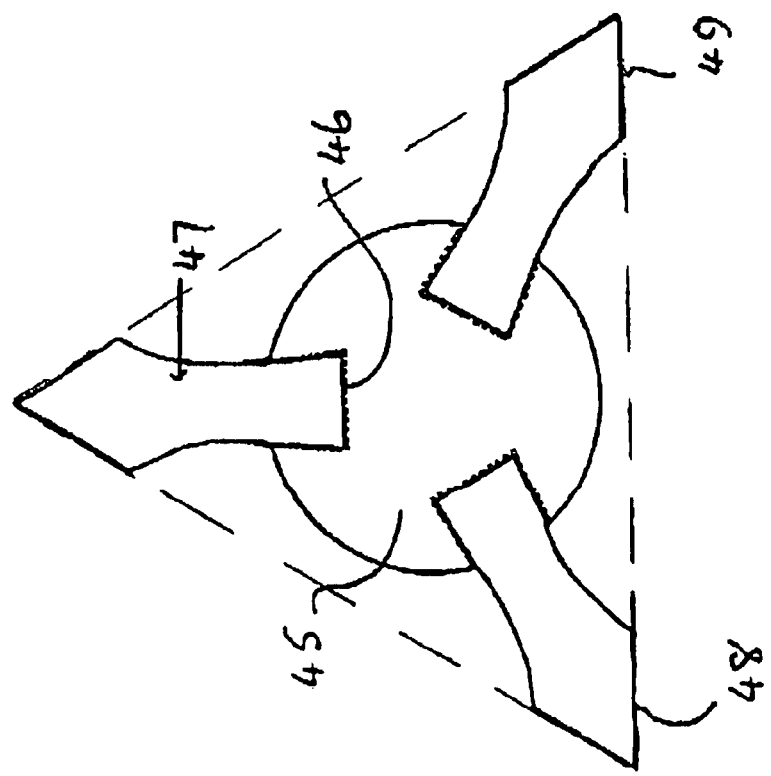
FIG. 5 is a cross-sectional view similar to that of FIG. 4 but showing another construction.

FIG. 5 shows a cross-sectional view of another embodiment, omitting the levelling tube or tubes for the sake of clarity. The level consists essentially of a central cylindrical core member 45 having longitudinal grooves or channels 46 formed in its surface and extending radially inwardly. The channels are dovetailed in shape, being broader across the base than across the mouth. Each channel receives the base of a radially-disposed flange element 47 with end faces 48, 49 which converge to form respective apices of a notional triangle (indicated by dashed lines) which encompasses the cross-sectional shape. The flanges are mechanically locked in the grooves and individual flanges may therefore be replaced if damaged, although the flanges may be glued in place for additional rigidity and strength. As with the embodiment of FIGS. 3 and 4, the face 48 of one flange is coplanar with the face 49 of another flange to provide for stability on a flat surface.

Figure 6:
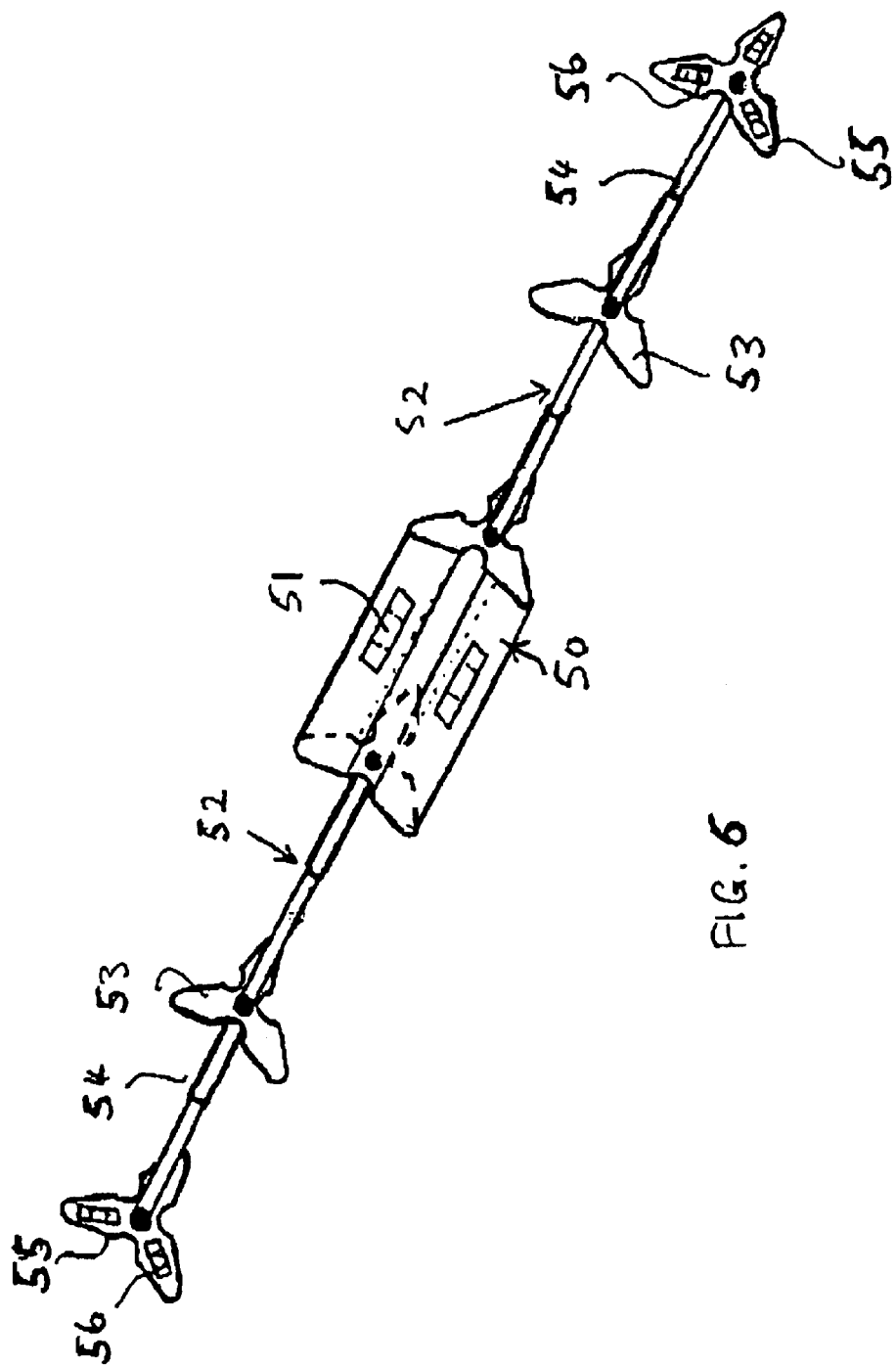
FIG. 6 is a perspective view of an embodiment with extendible ends.

FIG. 6 shows an embodiment in which a central body member 50 of triangular tri-lobal cross sectional configuration including a levelling tube 51 in each lobe has axial telescopic tubes 52 extending from each end carrying ti-lobal members 53 to which are attached outer telescopic tubes 54 carrying outer tri-lobal members 55. The tubes 52, 54 are non-circular, for example D-shaped, in cross section to prevent axial rotation and the lobes of the members 53, 55 are in longitudinal registration with each other and with the lobes of the central body member 50. The outer tri-lobal member 55 carry further levelling tubes 56. In use, the members 53, 55 may be axially extended as necessary for use on a larger-size workpiece such as the upper surface of a masonry or brick wall under construction.

FIG. 7 shows another construction of a cylindrical core member 57 formed with radial channels 58 extending inwardly from the surface and disposed equi-angularly about the axis. The side walls of the channels are formed with grooves 59. The flange elements 60 are formed from pressed sheet metal 61; tie base portions 62 of the flanges have longitudinal projections 63 and the base portions 62 of two adjacent flanges are accommodated back-to-back in a common channel 58 with the projections 63 engaged in the grooves 59.

What is claimed is:

1. A spirit level comprising a body member containing a leveling tube, the body member comprises a central hub region, having three radially elongate wing or flange members each extending radially therefrom in an equi-angular configuration, each wing or flange member providing a workpiece-contacting surface which is co-planar with another such surface of either adjacent flange member, characterized in that the workpiece contracting surface of each wing or flange member are separated by a recess which extends longitudinally substantially the entire length of the body member, adjacent wing or flange members having walls which extend from an apex and subtend an angle of 120 degrees between them and one or more of thewing or flange members including levelling tubes disposed orthogonally to the longitudinal axis to enable vertical and angled surfaces or workpieces to be tested.

2. A spirit level according to claim 1, in which at least one of the wing or flange members also includes levelling tubes disposed at an acute angle to the longitudinal axis of the spirit level, to enable angled surfaces or workpieces to be tested.

3. A spirit level according to claim 1, the body member having axially-extendable end members.

4. A spirit level according to claim 1, in which the hub region is formed with recesses or cavities for receiving keying portions of the flange members.

5. A spirit level according to claim 4, in which the cavities are dovetail-shaped in cross section.

6. A spirit level according to claim 4, in which the flange members are formed from sheet material to a desired cross-sectional shape and have base elements which engage in the recesses or cavities.

7. A spirit level according to claim 6, in which the base elements of adjacent flange members are accommodated in side-by-side relationship in a common recess and are retained therein by virtue of projection on either the base elements or recess walls and which engage in corresponding grooves formed in the other of the base elements and recess walls.

* * * * *